United States Patent [19]
Menchhofer

[11] Patent Number: 5,665,440
[45] Date of Patent: Sep. 9, 1997

[54] CASTING OF PARTICLE-BASED HOLLOW SHAPES

[75] Inventor: Paul Menchhofer, Oak Ridge, Tenn.

[73] Assignee: Martin Marietta Energy Systems, Inc., Oak Ridge, Tenn.

[21] Appl. No.: 411,431

[22] Filed: Mar. 27, 1995

Related U.S. Application Data

[62] Division of Ser. No. 83,965, Jun. 25, 1993, Pat. No. 5,419,860.

[51] Int. Cl.$^6$ .......................... B29D 22/00; C04B 35/634
[52] U.S. Cl. .................. 428/34.5; 428/35.7; 428/36.92; 428/220; 264/109; 264/650
[58] Field of Search .................. 264/63, 68, 109; 428/34.5, 36.4, 35.7, 36.9, 36.92, 34.4, 220

[56] References Cited

U.S. PATENT DOCUMENTS

| | | | |
|---|---|---|---|
| 3,423,358 | 1/1969 | Burke, Jr. | 260/11 |
| 4,132,564 | 1/1979 | Burke, Jr. et al. | 106/308 |
| 4,587,068 | 5/1986 | Borase et al. | 264/63 |
| 4,734,237 | 3/1988 | Fanelli et al. | 264/109 |
| 4,839,115 | 6/1989 | Babcock et al. | 264/109 |
| 4,853,053 | 8/1989 | Minjolle et al. | 264/68 |
| 4,882,112 | 11/1989 | Maki et al. | 264/109 |
| 4,894,194 | 1/1990 | Janney | 264/109 |
| 4,906,424 | 3/1990 | Hughes et al. | 264/63 |
| 4,965,039 | 10/1990 | Schuetz | 264/553 |
| 5,028,362 | 7/1991 | Janney et al. | 264/63 |
| 5,266,370 | 11/1993 | Woodson et al. | 428/36.92 |
| 5,419,860 | 5/1995 | Menchhofer | 264/109 |

OTHER PUBLICATIONS

Gelcasting of Alumina by Albert C. Young, Ogbemi O. Omatete, Mark A. Janney and Paul A. Menchhofer, Journal of The American Ceramic Society, vol. 74, No. 3, Mar. 1991.

IBM Technical Disclosure Bulletin, vol. 14, No. 10 (Mar. 1972) (1 page).

*Primary Examiner*—Rena Dye
*Attorney, Agent, or Firm*—Robert O. Fox

[57] ABSTRACT

A method for the production of hollow articles made of a particle-based material; e.g., ceramics and sintered metals. In accordance with one aspect of the invention, a thermally settable slurry containing a relatively high concentration of the particles is coated onto a prewarmed continuous surface in a relatively thin layer so that the slurry is substantially uniformly coated on the surface. The heat of the prewarmed surface conducts to the slurry to initiate a reaction which causes the slurry to set or harden in a shape conforming to the surface. The hardened configurations may then be sintered to consolidate the particles and provide a high density product.

6 Claims, 2 Drawing Sheets

CASTING OF PARTICLE-BASED HOLLOW SHAPES

This is a division of application Ser. No. 08/083,965, filed Jun. 25, 1993, now U.S. Pat. No. 5,419,860.

The United States Government has rights in this invention pursuant to blanket license agreement No. DE AC05-840R21400 awarded by United States Department of Energy Contract with Martin Marietta Energy Systems, Inc.

TECHNICAL FIELD

This invention relates generally to articles produced from powders and processes for producing articles from powders. More particularly, this invention relates to a process for use in the production of articles made by sintering particles in a desired form.

BACKGROUND OF THE INVENTION

Conventional methods for producing particle-based materials involve forming powders into various solid shapes and firing the bodies at a sufficiently high temperature (sintering) to cause the particles to consolidate into a high density solid. Conventional methods are not well-suited to the manufacture of certain object such as hollow spheres and other thin-walled articles which are difficult to mold and to remove from mold without damage.

SUMMARY OF THE INVENTION

Accordingly it is an object of the present invention to provide a method for the production of materials made from powders such as sintered ceramics and the like.

Another object of the present invention is to provide a method for producing hollow and thin-walled articles.

A further object of the present invention is to provide a method of the character described for producing articles of desired shapes which are substantially self-supporting in the green state prior to any drying or heating.

Still another object of the present invention is to provide a method of the character described which enables production of articles which heretofore have been difficult to make with known production techniques.

An additional object of the present invention is to provide a method of the character described which is cost effective and uncomplicated.

DETAILED DESCRIPTION OF A PREFERRED EMBODIMENT

Having regard to the foregoing and other objects, the present invention is directed to a process for the production of articles of a desired shape from a particle-based material.

According to the invention, a thermally settable slurry containing a relatively high concentration of the particles dispersed therein is coated onto a substantially continuous surface in a relatively thin layer and the temperature of the surface is controlled to cause the slurry on the surface to set into a relatively hard mass generally conforming to the shape of the surface. The hardened mass may then be removed from the surface as a substantially self-supporting solid having a high green strength.

A particularly advantageous embodiment of the invention involves the production of hollow ceramic shapes, such as spheres formed through the consolidation of ceramic particles or powders wherein the particles are incorporated into a thermally settable slurry in a relatively high concentration such that the resulting green product readily achieves a high density solid article of the desired shape when sintered.

Manufacture of such articles in accordance with the invention is advantageous over previous methods in that hollow and thin-walled articles such as spheres, tubes and other hollow shapes of improved quality are achieved-with reduced effort and with reduced damage to the article.

This invention also enables the production of hollow articles without the need for internal space-forming dies and the like and their associated cost and complexity.

BRIEF DESCRIPTION OF THE DRAWINGS

The above and other features and advantages of the present invention will become further known from the following detailed description when considered in conjunction with the accompanying drawings in which:

FIG. 4a is a perspective view of a hollow tube produced in accordance with the present invention and FIG. 4b is a forming surface suitable for forming the tube shown in FIG. 4a.

DETAILED DESCRIPTION OF PREFERRED EMBODIMENTS

Figure 1:
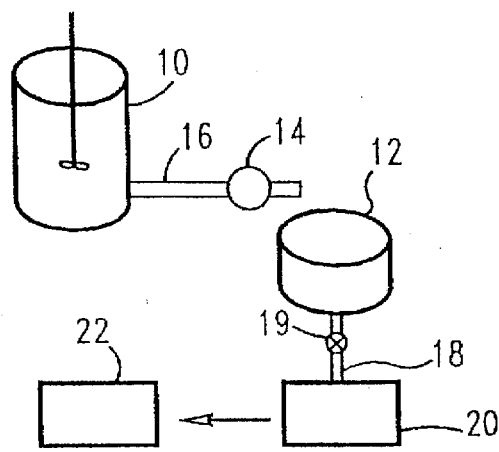
FIG. 1 is a block diagram illustrating steps in a process for the production of particle-based articles in accordance with the present invention.

With initial reference to FIG. 1, there is shown a block diagram illustrating steps in a process according to the invention for use in the production of hollow and other thin-walled articles made by sintering particles in a desired form. As used herein, the term "sintering" is understood to refer broadly to a process of consolidation or integration of essentially discrete particles to produce a solid. Various such processes are known to those of ordinary skill in the art and they typically involve the application of heat, pressure and/or other effects sufficient to cause consolidation of adjacent particles essentially without melting. The material comprising such articles is sometimes referred to herein as "particle-based" material.

In the practice of the invention, a preferred starting material for producing the articles is a relatively low viscosity slurry including a relatively high concentration of powders or particles such as a ceramic powder, a dispersant for the powder, and a solvent containing one or more monomers (binders) which crosslink under the influence of an initiator and the application of heat to form a polymer gel matrix which binds the powder particles together into a solid green body. Optionally, the slurry may further include a catalyst to expedite the cross-linking reaction.

In the context of the invention, it will be understood that the term "heat", as used in connection with the act of heating the slurry to solidify the slurry, is a relative term in that solidification or gelation of the slurry may be accomplished under various thermal environments (i.e. typically between about 0° C. and 100° C. or higher) depending on the slurry composition, especially the amount of initiator and catalyst in the slurry.

It is noted that the invention will be described in the context of a preferred embodiment involving the production of hollow, thin-walled ceramic spheres by introducing a slurry containing a ceramic powder or particles into a pre-warmed forming vessel which is a negative of the sphere to be formed. The vessel is then tumbled so that the slurry uniformly coats the inner, substantially continuous forming surface of the vessel. Heat conducts from the forming surface of the vessel to the slurry during tumbling of the vessel to initiate crosslinking of the binders to cause the slurry to harden or set into a shape corresponding to the inner surface of the vessel. However, beyond the described embodiment, it is believed that the invention finds application generally to the production of articles produced from particles and powders of various sorts such as, for example, glass powder used to make fritted glass and metal powders used to make sintered metal articles.

Articles of a variety of shapes and dimensions may be produced by applying the slurry to various substantially continuous forming surfaces resembling the article to be produced or resembling a negative of the article to be produced. In this regard, it is noted that the invention enables production of articles of complex shape without the need for internal space-forming dies and the like and their associated cost and complexity.

The slurry is preferably prepared in a mixing tank indicated at 10 and is then conveyed to a slurry supply tank 12, preferably a refrigerated tank (0° C. to 20° C. ), as by a pump 14 and conduit 16. A predetermined quantity of the slurry from the supply tank 12 is introduced, such as by pouring or by flowing through conduit 18 under the influence of gravity, into a suitable forming vessel 20, preferably formed of a rigid, non-porous material such as aluminum or glass. The amount-of slurry introduced is controlled, as by valve 19 located in-line with conduit 18. The inner surface of the vessel 20 is preferably pre-coated with a suitable release agent, such as a spray known as AZN-MOLD-WIZ available from Axel Plastics of Woodside, N.Y. and is also preferably pre-warmed to a temperature sufficient to cause the monomer solution to set (through polymerization and cross-linking) and bind the particles into an essentially solid self-supporting form having the desired cross-sectional configuration. For the ceramic slurry, the vessel is preferably pre-warmed to about 80° C.

Following introduction of the slurry into the forming vessel 20, the vessel is gyroscopically manipulated and preferably tumbled, i.e. omnidirectionally rotated and translated, as indicated by the direction arrows A and B, to cause the slurry to be substantially uniformly coated or spread over the inner surface of the vessel 20 before it begins to set. Tumbling of the vessel 20 is preferably continued until after the slurry has set or hardened into an essentially solid, self-supporting form. The essentially solid self-supporting form is then removed from the vessel 20 to provide a ceramic article, such as sphere having a desired configuration.

Tumbling of the vessel 20 may be accomplished in any suitable manner, such as by hand or by use of a suitable tumbling device which provides omnidirectional rotation and translation of the vessel to cause the slurry to become substantially uniformly coated onto the forming surface. Accordingly, the term "tumbling" will be understood to refer to providing rotational and/or translational motion to the surface to effect substantially uniform coating of the slurry onto the forming surface.

The ceramic article or product is in a saturated, green condition as it is removed from the vessel 20 in that it still contains most if not all of the liquid from its former low viscosity slurry form. The use of a slurry which contains a high powder content is preferred in the invention (e.g., 50-60 volume %). By employing such a high powder content, the powder particles are closely packed and the formed article is of near net final shape and dimensions, and any shrinkage or warpage experienced during drying is minimized. In addition, the closely packed particles are bound by the cross-linked and polymerized monomers such that the resulting article or product is quite strong and is an essentially self-supporting solid. This enables the product to substantially retain the desired configuration without external support and to substantially retain the desired cross-sectional configuration after subsequent finishing steps such as heating and/or sintering steps to remove the solvent and polymerized monomers and to further consolidate or sinter the particles, as at 22.

The conduit 18 and valve 19 cooperate to introduce the slurry into the vessel 20 in an amount sufficient to coat the interior surface of the forming vessel, it being understood that the amount of slurry introduced determines the ultimate thickness of the article produced. For example, with reference to FIGS. 2 and 2a, there is shown a forming vessel, in the form of a sphere negative 26, suitable for the production of a hollow sphere 28, shown in cross-section in FIG. 3d.

The relationship between the volume of slurry to be introduced and the diameter and wall thickness of the sphere to be cast is shown in Table 1.

TABLE 1

| Outer Diameter (inch) | Volume of slurry (mls) for sphere having ⅛ inch wall thickness | Volume of slurry (mls) for sphere having ¼ inch wall thickness |
| --- | --- | --- |
| 0.5 | 0.9 | — |
| 1.0 | 5.0 | 7.5 |
| 2.0 | 22.7 | 39.7 |
| 3.0 | 53.2 | 97.6 |
| 4.0 | 96.7 | 181.3 |

Figure 2:
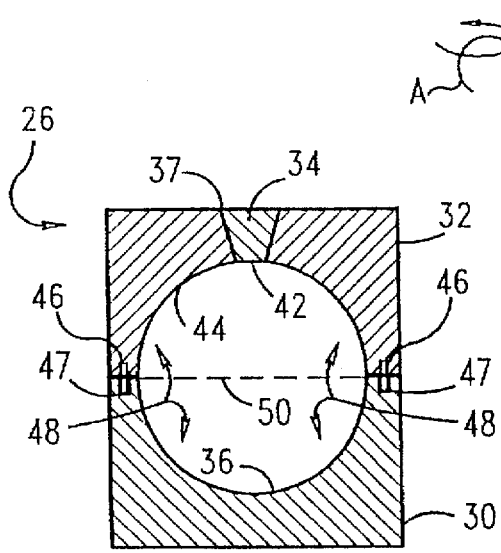
FIG. 2 is a cross-sectional view of apparatus suitable for forming hollow spheres and FIG. 2a is an exploded view of FIG. 2.
Figure 2A:
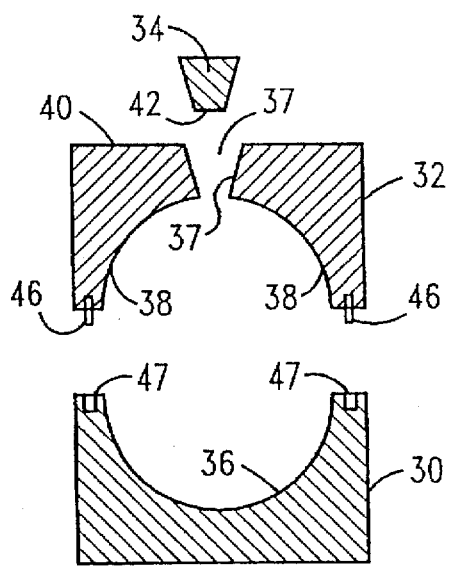

With continued reference to FIGS. 2 and 2a, the negative 26 is preferably aluminum and includes a bottom 30 and a top 32 having a removable fill plug 34. The bottom 30 is shaped to provide a substantially hemispherical inner surface 36 having a radius of curvature corresponding to the desired outer radius of the sphere to be produced. The top 32 is identical to the bottom 30, except it further includes a fill port 37 in the form of an inwardly tapered smooth bore extending between an inner surface 38 and an outer surface 40 of the top 32 for introducing slurry into the negative 26.

The removable fill plug 34 substantially corresponds in size and shape to the port 37 so that the plug 34 may be fittingly received within the port 37 to close the vessel 20 following introduction of the slurry into the negative 26. To this end, it is noted that the plug 34 preferably includes a lower surface 42 having a configuration such that when installed in the port 37, the inner surface 38 of the top 32 and the lower surface 42 of the plug provide a substantially hemispherical surface 44 that is substantially identical to the hemispherical surface 36 of the bottom 30.

The bottom 30 and top 32 may be aligned (with the aid of optional index pins 46 and bores 47) so that the surfaces 36 and 44 face one another and provide a substantially continuous spherical forming surface 48. In this regard, it will be understood that the term "substantially continuous" is used herein to account for the presence of relatively small breaks in a surface. For example, the juncture between the surfaces 38 and 44 defines an equilateral parting line 50 between the abutting surfaces 36 and 44. The parting line 50 is preferably so small as to be virtually unnoticeable, yet still represents some degree of discontinuity in the forming surface 48. Likewise, such a discontinuity is present at the juncture between the fill plug 34 and the port 37.

Figure 3A:
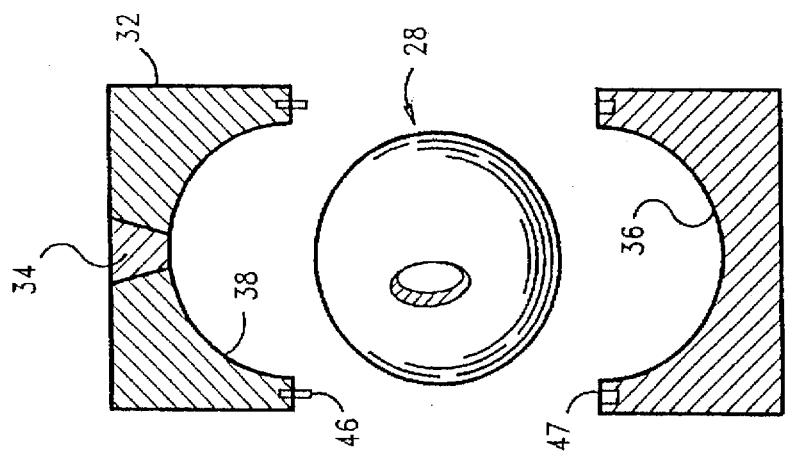
FIGS. 3a-3d are steps in the production of a hollow sphere produced in accordance with the present invention.
Figure 3B:
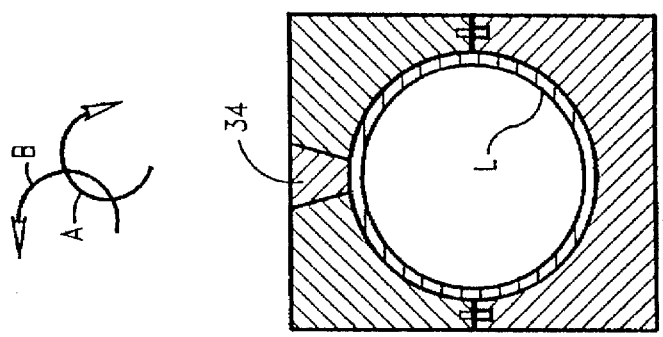
Figure 3C:
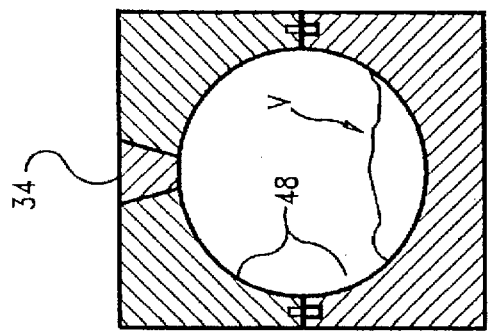
Figure 3D:
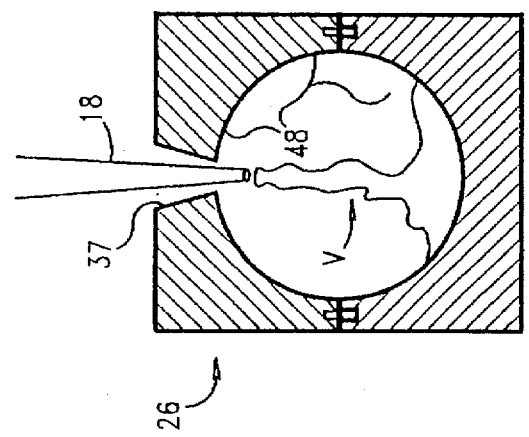

With reference to FIGS. 3a–3d, to produce a spherical, hollow article, such as sphere 28, the negative 26 is preferably pre-warmed to about 80° C. and the plug 34 is removed from port 37 for introducing a predetermined volume V of slurry into the vessel 20, as by injector 18 (FIG. 3a). The plug 34 is then replaced into the port 37 to close the vessel 20 (FIG. 3b) and the negative 26 is tumbled to uniformly coat the forming surface 48 with a relatively thin layer L of the slurry (FIG. 3c). During tumbling of the negative 26, heat conducts from the forming surface 48 to and through the slurry to drive the cross-linking reaction to cause the slurry to rapidly set or harden into a spherical shape generally conforming to the shape of the forming surface 48 0f the negative 26. After the slurry has set, the bottom 30 and top 32 may be separated by pulling them apart from one another and the resulting green, hollow sphere 28 may be removed (FIG. 3d). To facilitate removal of the sphere, the forming surface 48 of the negative is preferably pre-coated with a suitable release agent such as AZN-MOLD-WIZ.

As mentioned, the negative 26 is preferably prewarmed to a temperature sufficient to cause the monomer solution to rapidly set. This temperature is dependent upon the composition of the slurry, and for the ceramic slurry, this is generally between about 0° C. and 100° C. and is preferably about 80° C. In regards to the term "rapidly", this term is used herein to refer to the set time for the ceramic slurry and it should be understood that the term "rapidly" is not believed to be a critical limitation, but is a relative term, since the slurry system generally sets within a few seconds, but, depending upon the temperature and amount of initiator and catalyst, the slurry may take 30 minutes or more to set and the slurry may set at various times.

In addition to the negative 26, other forming surfaces may be used depending on the desired shape of the article to be produced. For example, to produce hollow spheres the slurry may be coated, as by spraying, over an inflatable surface, such as a balloon. Also, complex thin walled articles may be produced by coating a relatively thin layer of the slurry onto a suitably shaped forming surface and warming the surface until the slurry sets.

Figure 4B:
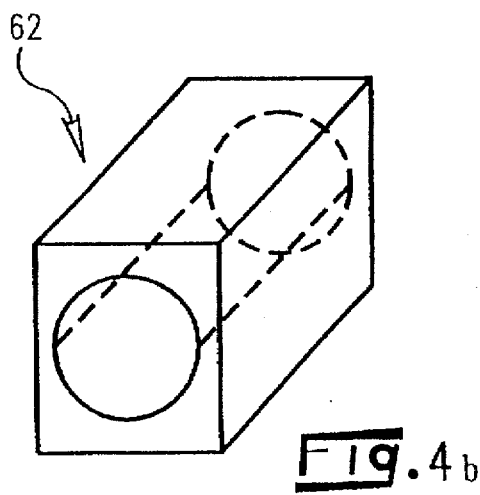
Figure 4A:
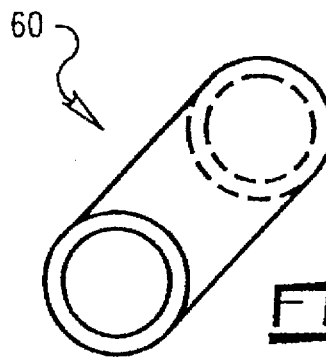

As set forth above, the present invention enables the production of hollow articles without the need for internal space-forming dies. To further illustrate this feature, it will be understood that articles such as elongate, thin-walled tubes, such as tube 60 shown in FIG. 4a, may be produced by coating the slurry onto the interior continuous surface of a cylindrical-shaped forming surface 62 (FIG. 4b) in a relatively thin layer and warming the surface until the slurry sets. This eliminates the need for an internal mandrel common to conventional tube-forming processes and simplifies production of the tube.

As mentioned, the green product may be heated following removal from the vessel 20 to substantially remove the water or other solvent and provide a dried product. Although the specific temperature and time necessary for drying the product depends on the composition of the slurry and other factors, adequate drying generally may be achieved by slowly heating the body in a controlled humidity environment from room temperature to about 120° C. The polymerized monomer(s) may be substantially removed from the product by further heating at higher temperatures, for example, from about 300° C. to about 600° C., over a suitable period of time to effect removal.

Finally, the product may be sintered to consolidate the particles and form a high density body. The various sintering temperatures and conditions for ceramic powders are well known in the art. Substantial removal of polymer components may be accomplished as a low-temperature step during the sintering process. That is, the processes of drying, monomer removal and sintering may be sequential stages of a continuous heating process wherein the final state of the product is achieved.

Ceramic powders suitable for use in the present invention include, but are not limited to, alumina, fused silica, magnesia, zirconia, spinels, mullite, tungsten carbide, silicon carbide, boron nitride, silicon nitride and mixtures thereof.

In a preferred embodiment, the powder is mixed with a dispersant compatible with the powder and a monomer solution to form a thermally settable slurry mixture having a relatively high concentration of powder particles, as described in U.S. Pat. Nos. 5,028,362 and 4,894,194 to Janney, et al. the disclosures of which are incorporated herein by reference. The monomer solution provides a low viscosity vehicle for the ceramic powder in a high solids concentration. Additionally, when heated, the monomer solution polymerizes and crosslinks to provide a firm, strong polymer-solvent gel matrix with the powder dispersed therein. The gel matrix immobilizes the powder in the desired shape conforming to the continuous surface onto which the slurry mixture is coated. The resultant "green" product exhibits exceptionally high strength and good particle homogeneity.

Various dispersants for powders are known in the art and are appropriate for use in the present invention. Care should be exercised, however, in order to select a dispersant which does not interact in an undesirable manner with the components of the monomer solution, particularly the initiator or the solvent. A particular dispersant may be evaluated for suitability with a particular powder and a particular monomer solution by mixing small amounts of the respective components and judging the flow properties of the resultant mixture, whether the resultant mixture exhibits a notable and repeatable yield point, and/or whether the mixture is dilatant. Preferred dispersants for ceramic powders in water include acrylic and methacrylic acid salts. Preferred dispersants for ceramic powders in an organic solvent include ethoxylated alkylphenol dispersants. Generally, the dispersant is used in a small amount, by volume, as compared with the amount of the powder included in the mixture; e.g., from about 0.02 to about 0.04 volume percent.

The monomer solution which is mixed with the ceramic powder and the dispersant to form the slurry preferably includes at least one monofunctional monomer, at least one difunctional monomer, a free-radical initiator compound and a solvent. Generally, the monofunctional monomer includes one functional group such as a vinyl or allyl group and the difunctional monomer includes two such groups.

Generally, the amount of monomer included in the monomer solution determines the degree of hardness of the resulting product. In general, green ceramic products of suitable rigidity may be formed using no more than about 20 volume percent monomers in the solution, and in a preferred embodiment, the solution comprises from about 5 to about 20 volume percent monomer. The monomer solution may comprise from about 35 to about 60 volume percent of the slurry.

The use of an aqueous solvent is preferred in the process of the present invention when casting ceramic articles.

However, in some cases such as when the powder reacts with water, specific monomers and initiators are chosen which are compatible with an organic solvent. The organic solvent substituted for the water in this process may comprise any organic solvent that will dissolve the multi-functional monomers and which exhibits a low vapor pressure and low viscosity at the temperature at which the multi-functional monomer polymerizes and crosslinks.

The monomer solution may further comprise a free-radical initiator compound for initiating the polymerization and cross-linking of the monomer when the slurry mixture is heated. Various thermally activated free-radical initiator compounds are known in the polymer art and are suitable for use in the method of the present invention. Preferred free radical initiator compounds for use with ceramic powders include ammonium persulfate and potassium persulfate. The preferred free-radical initiator is generally inactive at the expected storage temperature so that the shelf-life of the monomer solution is relatively long. However, once the slurry mixture containing the monomer solution is heated to the desired setting temperature, the initiator compound aids in achieving a relatively high reaction rate whereby polymerization and crosslinking of the monomers is easily and quickly achieved.

The amount of initiator included in the monomer solution is generally small as compared with the amount of monomer included in accordance with conventional polymerization methods. A preferred catalyst is $N,N,N^1,N^1$-tetramethylene diamine (TEMED) available from Malinkrodt, Inc., of Paris, Ky. By controlling the initiator to monomer ratio, the presence and amount of catalyst, the temperature of the slurry, and the residence time on the surface or surfaces, a cast body can be made to polymerize at temperatures ranging from about 0° to about 95° C. in order to develop optimum properties in the green body.

EXAMPLE 1

An aqueous suspension was prepared by mixing an alumina powder available under the trade designation RCLS-DBM from Reynolds Chemical Co., of Bauxite (Ark.) with deionized high purity water, polymerizable monomers, a dispersant, and a sintering aid. Both a monofunctional monomer, acrylamide (AM), and a difunctional monomer, N,N'-methylene-bisacrylamide (MBAM) were used in this example. The dispersant was a 40% aqueous solution of ammonium polyacrylate available under the trade designation Darvan 821A from R. T. Vanderbilt Co., Greenwich, Conn. Magnesium oxide powder (0.05 wt % of the total solids weight) was added to the slurry as a sintering aid. A 1000 ml batch of slurry (55 volume % solids) was prepared as follows:

| | |
|---|---|
| a. 550 ml solids | $Al_2O_3$: @ 3.97 g/ml = 2183.50 g |
| | MgO: 0.05 wt % = 1.09 g |
| b. 450 ml liquids | Premix "C" 426.31 ml |
| | Darvan 821A 23.69 ml |
| c. Premix "C" | 7 parts aqueous solution containing 20 wt % AM |
| | 3 parts aqueous solution containing 2 wt % MBAM |

The preferred order of addition is as follows. The Premix "C" solution was prepared and the dispersant added, followed by the alumina powder. A small amount of the liquid was retained for combination with the MgO powder. The MgO was mixed with this solution (1 ml dispersant: 4 ml of the premix solution) and added to the slurry while stirring.

The slurry was mixed at about 800 rpm using a Caframo RZR-2000 lab stirrer, followed by continuous mixing on a laboratory shaker for about 8 hours. After mixing, the slurry was degassed on a laboratory Roto-evaporator at 0° for approximately 1 hour.

The initiator was a 5 wt % aqueous solution of ammonium persulfate $(NH_4)_2S_2O_8$. Prior to the beginning of a run, a series of initiator-response tests were conducted to quantify the working time at various additions of the initiator. Because there is an occasional variation in the reactivity of the initiator and monomers due to age and concentration, pre-trials were used to determine the precise initiator ratios. For this example, a ratio of 20 ml slurry: 20 µl T.E.M.E.D.: 75 µl of 5 wt % aqueous solution of ammonium persulfate solution was determined to give the optimum degree of response for samples thermally polymerized at 70° C. Subsequent evaluation showed that a ratio of 20 ml slurry: 10 µl T.E.M.E.D.: 50 µl 15 wt % ammonium sulfate solution was also suitable. After the pre-chilled initiator solution was added, the slurry was mixed for an additional 5 minutes in the roto-evaporator before transfer to the apparatus. The viscosity of the solution at approximately 1° C. was not measured but was observed to be similar to the viscosity of water.

About 100 ml of the slurry was introduced into the negative 26, having an inner diameter of 3.0 inches and pre-warmed to a temperature of about 80° C. The plug was fitted into the port and the negative tumbled slowly to achieve a uniform coating on the inner surface until polymerization was completed. The top and bottom of the negative were then separated to yield a solidified hollow sphere having good surface characteristics, uniformity and green strength.

Various temperatures, as well as catalyst/initiator ratios were explored to determine the optimum range for this process. The best results were achieved wherein the mold was preheated to 80° C., and a chilled and degassed slurry having a volume of 100 mls and a composition of 20 mls slurry: 10 µl T.E.M.E.D.: 50 µl initiator was poured into the negative 26 followed by slow tumbling to achieve an even coating. The time allowed for complete polymerization was observed to be between about 5 and 20 minutes, depending on the slurry composition, diameter and wall thickness.

The foregoing description of certain embodiments of the present invention has been provided for purposes of illustration only, and it is understood that numerous modifications or alterations may be made without departing from the spirit and scope of the invention as defined in the following claims.

The embodiments described herein are the best mode known to applicant for practicing the invention, but it will be understood that other ways of producing articles according to the claims are encompassed by the invention.

What is claimed is:

1. A one-piece seamless substantially closed continuous-walled ceramic article defining an interior space therein, said article being produced by the steps of providing a thermally settable ceramic slurry containing ceramic particles dispersed therein, providing a substantially continuous and substantially spheroidal forming surface, coating the slurry onto at least a portion of the spheroidal forming surface in a relatively thin layer, tumbling the spheroidal forming surface so that the slurry substantially uniformly coats the spheroidal forming surface, controlling the temperature of the slurry so that the coated slurry sets into a relatively hard mass having a hollow, spheroidal shape generally conforming to the spheroidal shape of the forming surface, and separating the hardened mass from the spheroidal forming surface as a substantially self-supporting solid spheroid.

2. The article of claim 1, wherein the solid spheroid has a wall thickness of between about $\frac{1}{8}$ and $\frac{1}{4}$ inches and an outer diameter of between about 0.5 and 4 inches.

3. The article of claim 1, further comprising the step of sintering the separated solid spheroid to cause consolidation of particles contained therein.

4. The article of claim 1, wherein said ceramic slurry comprises ceramic powder and a dispersant for said ceramic powder in an aqueous solution containing monomers wherein the monomers polymerize to form an essentially solid polymeric matrix supporting the ceramic particles therein as a dispersed phase.

5. The article of claim 1, wherein said step of controlling the temperature comprises warming the forming surface prior to introducing the slurry onto the forming surface.

6. The article of claim 1, wherein the thermally settable ceramic slurry sets at a predetermined temperature and the temperature of the forming surface is controlled to cause the ceramic slurry to set by rapidly adjusting the temperature of the ceramic slurry to the predetermined temperature upon introduction of the ceramic slurry to the forming surface.

* * * * *